No. 723,061. PATENTED MAR. 17, 1903.
C. P. STEINMETZ.
GENERATING ALTERNATING CURRENTS.
APPLICATION FILED JULY 31, 1899.
NO MODEL. 2 SHEETS—SHEET 1.

WITNESSES.
A. H. Abell.
A. F. Macdonald.

INVENTOR.
Charles P. Steinmetz
by Albert G. Davis
Atty.

No. 723,061. PATENTED MAR. 17, 1903.
C. P. STEINMETZ.
GENERATING ALTERNATING CURRENTS.
APPLICATION FILED JULY 31, 1899.
NO MODEL. 2 SHEETS—SHEET 2.

Witnesses. Inventor.
Charles P. Steinmetz.
by
Att'y.

UNITED STATES PATENT OFFICE.

CHARLES P. STEINMETZ, OF SCHENECTADY, NEW YORK, ASSIGNOR TO THE GENERAL ELECTRIC COMPANY, A CORPORATION OF NEW YORK.

GENERATING ALTERNATING CURRENTS.

SPECIFICATION forming part of Letters Patent No. 723,061, dated March 17, 1903.

Application filed July 31, 1899. Serial No. 725,617. (No model.)

*To all whom it may concern:*

Be it known that I, CHARLES P. STEINMETZ, a citizen of the United States, residing at Schenectady, county of Schenectady, State of New York, have invented certain new and useful Improvements in Generating Alternating Currents, (Case No. 867,) of which the following is a specification.

My present invention relates to the generation of alternating current and involves in its mode of operation the rotation of a closed conductor in synchronism with and in inductive relation to a magnetic field of force produced by a current or currents of alternating polarity.

For a more precise statement as to the scope of my invention reference is to be had to the claims appended hereto, the same to be taken in connection with the following description and the accompanying drawings.

Figure 1:
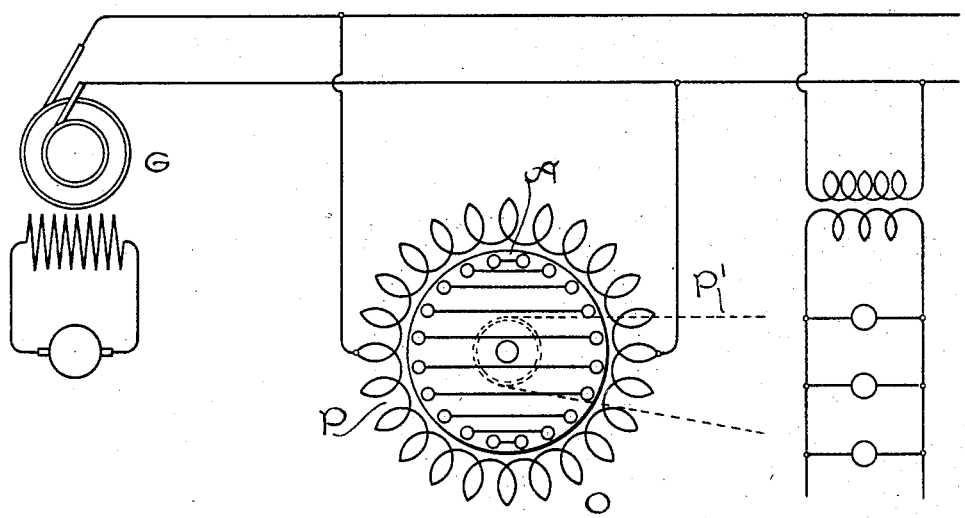
Figure 2:
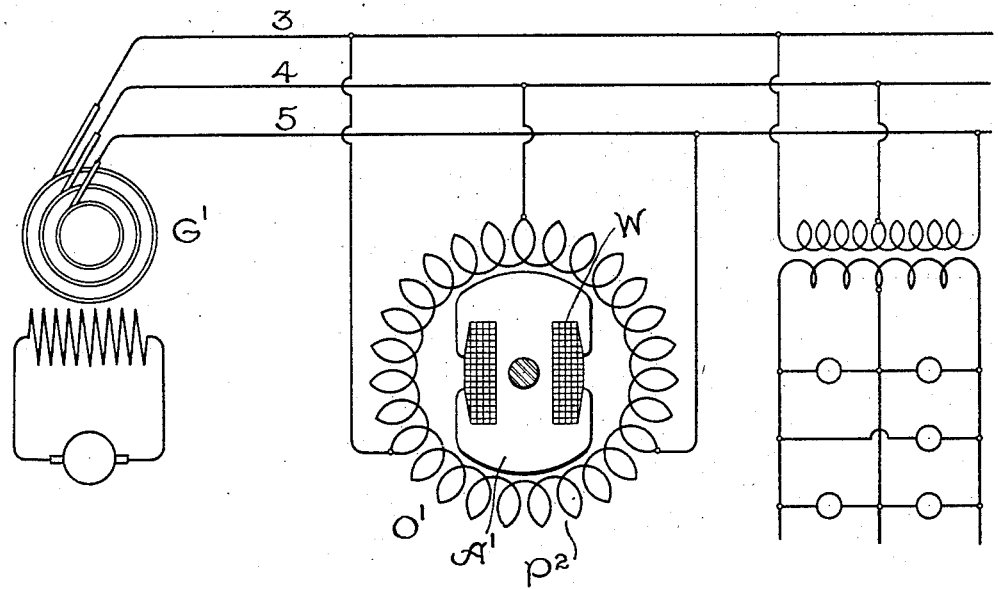
Figure 3:
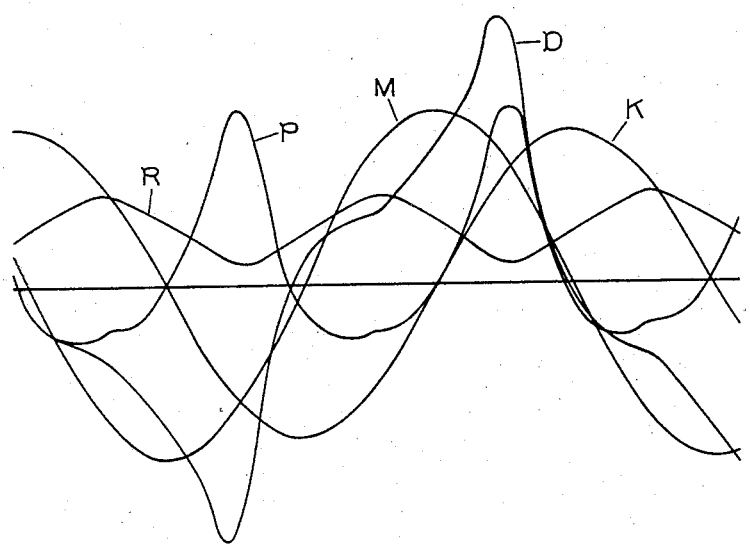

In the drawings, Figures 1 and 2 represent modifications of apparatus embodying my invention, while Fig. 3 is an explanatory diagram.

Before proceeding to a detailed explanation of the apparatus which I employ for carrying out my invention it is desirable to refer first to certain principles of operation in order the better to make clear my present understanding of the theory of my invention.

When a closed conductor is placed within the influence of a field of force due to an alternating current or currents, currents of electricity may be induced in that conductor by either or both of two causes—first, by the actual motion of the conductor through the field of force, or, second, by the induction of the field of force upon the conductor without any relative motion—such, for example, as exists in the ordinary transformer. So far as the nature of the induced currents is concerned the same result is produced whether the closed conductor be maintained stationary with respect to the inducing-circuits or be rotated in synchronism with the field due to such circuits. If the conductor be rotated at synchronism, the only electromotive force in the apparatus will be the electromotive force of self-induction, or, in other words, the electromotive force produced by the action of the alternating current upon itself. If there are no internal losses of energy in the apparatus, this electromotive force will be displaced ninety degrees from the alternating current flowing and will therefore be wattless. In other words, it will neither produce nor consume energy. If, however, this counter electromotive force be caused in some manner to have an energy component, the machine will act either as a generator or as a motor, depending upon the phase relation between the counter electromotive force and current. I have discovered that if mechanical power be applied so as positively to urge forward a conductor rotating as described in synchronism in a magnetic field the equivalent sine-wave of current will be brought partially into phase with the counter electromotive force of self-induction acting in the machine. This represents a consumption of power and its conversion into electrical energy in the alternating-current circuit. The apparatus thus acts as a generator. If no mechanical power is applied, the machine operates in synchronism as a motor. The reason why the counter electromotive force of self-induction of the alternating-current-inducing circuit is not wattless may be explained by the fact that the said circuit acts upon a moving closed conductor in inductive relation to it, which closed conductor by its relative motion causes a cyclic change in the mutual inductive relation existing between the two circuits. The better the mutual induction the more closely the closed conductor approximates a short-circuited secondary, while the poorer the mutual induction the more the alternating supply-circuit resembles an inductance or kicking coil. As is well known, an inductance-coil has a comparatively high coefficient of self-induction and its admittance is therefore low, while, on the other hand, an alternating circuit with a short-circuited secondary possesses high admittance due to the fact that the secondary acts to reduce the self-induction of the primary and to add an energy component to the primary current. The effect, therefore, of synchronously revolving a closed conductor in a magnetic field produced by alternating currents is to cause a pulsation in the admittance of the exciting circuit or circuits. When the closed conductor passes from one exciting-pole to the next exciting-pole, the admittance, which is evidently the same for each of these positions, must pass through one cycle in its progressive variation. The admittance therefore varies with twice the frequency of the alternating exciting-current. By reason of this pulsation of admittance the wave of exciting-current is distorted and its symmetry destroyed in such a manner as to cause its equivalent sine-wave, or wave of current equivalent in effect, to be displaced in phase from the wave of magnetization, which wave is in quadrature with the counter electromotive force of self-induction. The equivalent sine-wave of current therefore differs in phase from the wave of counter electromotive force by an angle which may be either greater or less than ninety degrees. This angle may be made less than ninety degrees, and thus represent the consumption of mechanical power and the production of electrical energy by giving the rotating closed conductor a positive forward thrust. In other words, the closed conductor, although rotating in synchronism, is to be urged forward by mechanical means. The result is the production in the alternating-current circuit of a wave of current more or less distorted from the sine form.

The above theory may perhaps be more readily understood by reference to Fig. 3, in which the operations taking place in the machine are indicated in a roughly-qualitative way. In this figure the cyclic curve M represents the wave of magnetism in the machine, while curve K represents the electromotive force induced thereby or, in other words, the counter electromotive force, the waves being displaced from each other in phase by ninety degrees. The variable reactance of the machine is represented by the double-frequency curve R, which when the machine is supplied with mechanical power is of such phase relation that its maximum value occurs when the magnetism is rising. The wave of current necessary to produce the requisite sine-wave of magnetism when the reactance is variable differs necessarily from a sine-wave and depends not only upon the character of the wave of variation of the reactance, but also upon the magnetic characteristics of the machine. The wave is, however, distorted, and one such wave is represented at D. By inspection it will be observed that the larger portion of the area of this wave is displaced less than ninety degrees from the counter-electromotive-force curve K, thereby indicating the consumption of mechanical power by the machine, and therefore the generation thereby of electrical energy. The product of the electromotive-force wave and the current-waves gives the double-frequency power-curve P, the major area of which, as will be seen, lies above the axis of coördinates, thereby indicating the production of electrical energy rather than its consumption.

In the diagram above given it is to be understood that the curves are intended merely for the purpose of elucidating the theory of operation heretofore set forth and are not intended to represent with absolute accuracy the quantitative actions existing in any particular machine.

In Fig. 1, G represents any suitable source of alternating current, which, as shown, is a dynamo-electric machine of the single-phase type. The primary member P of the generating device O is suitably wound to correspond and may resemble the inducing member of the ordinary single-phase induction-motor. Within the influence of the field produced by the member P is shown a relatively revolving member or armature of practically uniform magnetic reluctance in all directions at right angles to its axis and having short-circuited windings so related to each other as to add their effects and produce a distinct polar line or lines. In other words, the coils in their resultant action have a common axis or axes, so that in one position their mutual inductive relation with the exciting-windings P is a maximum, while in another direction it is a minimum, thus differing from the armature of an ordinary induction-motor in which the mutual inductive relation between the two members of the motor is approximately constant in all positions. For the purpose of applying power to the armature A, I may employ a belt, as indicated in dotted lines at P'; but it will be obvious that any other suitable and convenient means may be used.

Fig. 2 shows the application of my invention to a multiphase-current circuit. At G' I have indicated a suitable source of current connected to translating devices through lines 3 4 5. The machine indicated at O' has its primary member $P^2$ supplied in any usual manner with a three-phase winding connected through suitable leads with the mains 3 4 5. The secondary member of the machine consists of a shuttle-armature A', provided with the closed-circuited coil or winding W, revolving within the influence of the primary member $P^2$. This type of armature differs from that shown in Fig. 1 in that it has a variable magnetic reluctance due to its lack of symmetry, although both armatures are characterized by closed-circuited windings acting upon the armature to produce a resultant polar line or lines, thus varying the admittance of the primary exciting-circuit with varying relative positions of the two members of the machine.

The armatures shown may be used interchangeably, although for purposes of illustration I have shown one type as employed with a multiphase exciting-circuit and the other with a single-phase circuit; but for most purposes I prefer to employ the armature having uniform magnetic reluctance. Whichever type of machine be utilized, it is to be understood that suitable electrical connections are to be made between the primary member of the machine and the alternating-current circuit in connection with which it is to be employed and that some appropriate means for supplying mechanical power to the machine is to be provided—as, for instance, a belt or a direct mechanical connection with a source of power.

What I claim as new, and desire to secure by Letters Patent of the United States, is—

1. The method of generating electrical energy which consists in passing an alternating current through an electric circuit, thereby producing a magnetic field, and rotating a closed conductor within the influence of said field, thereby causing a pulsation of the admittance of the circuit of such nature as to bring the current therein partially into phase with the electromotive force in said circuit.

2. The method of generating current which consists in positively rotating a closed conductor in synchronism with and in inductive relation to a field of force due to the agency of alternating currents.

3. The method of generating alternating current which consists in passing an initial alternating current to a circuit, and reinforcing said current by positively and periodically varying the admittance of said circuit.

4. The method of generating electric current which consists in producing by an alternating current, an initial magnetic field, and reinforcing said current by positively rotating a closed conductor in said field with a speed corresponding to the frequency of said current.

5. The method of generating electric current which consists in producing by an alternating current, an initial magnetic field, and reinforcing said current by positively and synchronously rotating a closed conductor in said field.

In witness whereof I have hereunto set my hand this 28th day of July, 1899.

CHARLES P. STEINMETZ.

Witnesses:
 BENJAMIN B. HULL,
 MABEL E. JACOBSON.